Nov. 30, 1948.　　　E. G. BADER　　　2,454,984
CONTRACTILE FILM SPOOL
Filed May 30, 1945
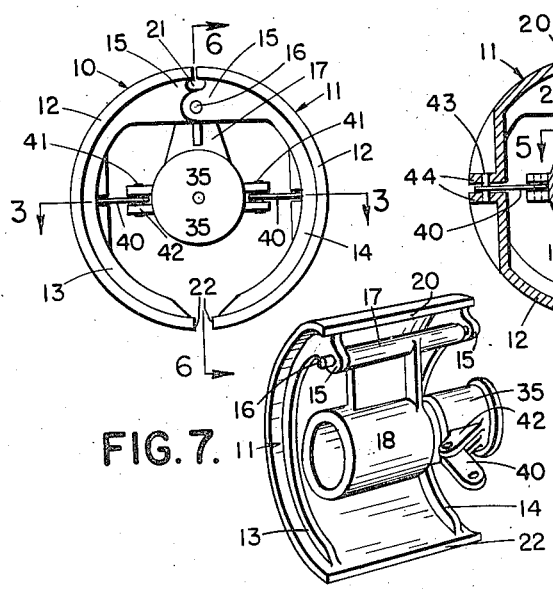
FIG. 1.
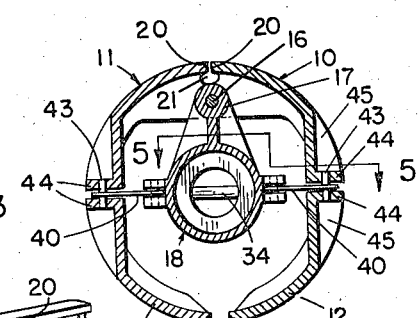
FIG. 2.
FIG. 7.
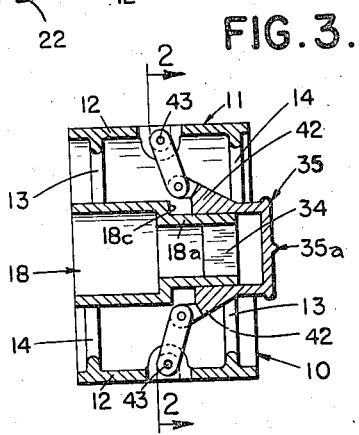
FIG. 3.
FIG. 6.
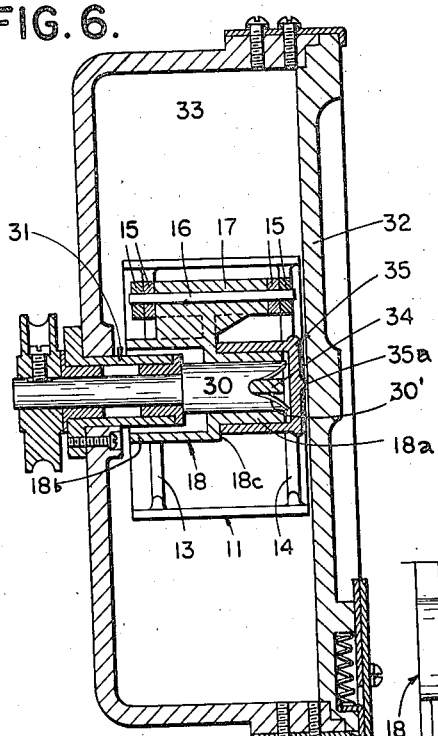
FIG. 4.
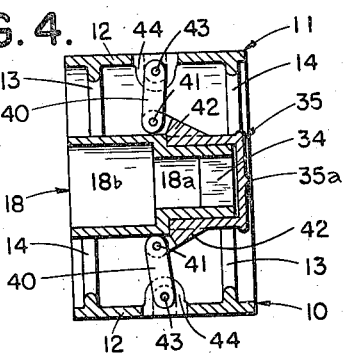
FIG. 5.
INVENTOR
EDWARD G. BADER
BY
ATTORNEYS Patented Nov. 30, 1948

2,454,984

UNITED STATES PATENT OFFICE 2,454,984

CONTRACTILE FILM SPOOL

Edward G. Bader, Hawthorne, Calif., assignor to Mitchell Camera Corporation, West Hollywood, Calif., a corporation of Delaware Application May 30, 1945, Serial No. 596,733

6 Claims. (Cl. 242—72)

This invention has generally to do with collapsible and expansible spools for winding strips of material, and more particularly with spools for winding motion picture film. When motion picture film is wound upon a take-up spool, with the film under some tension, the tightly wound coil of film binds the spool so tightly that the spool cannot be removed from the coiled film without considerable difficulty and without telescoping the film coil and causing injury to the film by rubbing.

It is among the general objects of this invention to provide a contractible film winding spool which is positive in its operation of expansion and contraction, which has a positive clamping grip on the end of the film when expanded, which is simple and inexpensive in structure and manufacture, and which is simple in operation and assures that when the spool is placed upon its spindle, in a magazine or otherwise, it is expanded. And in connection with the last mentioned feature of the spool, it is also a feature that, when the spool is placed on the spindle of a magazine the closure of the magazine cover also assures that the spool is expanded.

These and other objects and purposes and corresponding features of the invention will be best understood from the following description of one preferred form embodying the invention, shown in the accompanying drawings in which:

Fig. 1 is an end elevation of the spool in its expanded condition;

Fig. 2 is a transverse section taken in an aspect opposite to that of Fig. 1, and on line 2—2 of Fig. 3;

Fig. 3 is a longitudinal central section taken as indicated by line 3—3 on Fig. 1 but showing the spool in its contracted condition;

Fig. 4 is a similar section showing the spool in its expanded condition;

Fig. 5 is a fragmentary detail section taken as indicated by line 5—5 on Fig. 2;

Fig. 6 is a sectional view showing the spool mounted on a spindle in a magazine, the section of the spool being taken as indicated by line 6—6 on Fig. 1, and Fig. 7 is a fragmentary perspective of a portion of the spool.

As shown in preferred form in the drawings, the outer body portion or winding drum of the spool is composed of two winding drum members 10 and 11 which are preferably identic and preferably each substantially semi-cylindric. These members are formed with relatively thin cylindric walls 12 and with two internal strengthening ribs 13 and 14. Extensions 15 of these ribs form hinge lugs by which the two barrel halves are mounted on a hinge pin 16 which is carried in a hinge bracket 17 that projects from hub 18 of the spool. The axis of hub 18 and that of hinge pin 16 are parallel, the two drum halves 10 and 11 are substantially concentric about the hub axis when the spool is expanded. The hinge axis at 16, in the diametral plane which lies between the slightly spaced diametral faces of the two halves, lies inwardly of the two edges 20 of the two halves, but fairly close to those edges as shown in Figs. 1 and 2. The ribs 13 and 14 are relieved at 21 just inside the two edges 20, so that the end of a film may be inserted inwardly between those two edges; and the arrangements and proportion of the parts are such that when the halves are in their expanded position of Figs. 1 and 2, the two edges 20 are substantially abutting and positively and tightly grip the film end between them. The two halves are expanded by swinging them outwardly away from each other about pivot 16, and in that condition their two other edges 22 are separated by about the distance shown in Figs. 1 and 2. The spool is contracted by swinging the two halves inwardly toward each other about pivot 16 to a position where edges 22 come together; and in that condition the substantially abutting edges 20 are opened up sufficiently to release the film end or to allow easy insertion of the film end.

From an inspection of Figs. 3 and 6 it will be noted that the two drum halves 10 and 11 are duplicates but one of the halves, say 11, is turned end for end with relation to the other half 10, as shown in Fig. 3. The rib 13 of each half is located a little further inward from the adjacent end of the half than is the rib 14; the arrangement being such that when the hinge lug extensions 15 are placed in overlapping relation as shown in Figs. 1 and 6, the two barrel halves will be laterally in alinement with each other.

Hub 18 has a portion 18a adapted to fit closely but slidingly on spool spindle 30 (see Fig. 6), and an enlarged portion 18b adapted to clear the bearing assembly 31 in which spindle 30 is journaled. Spindle 30 projects from bearing 31 outwardly toward the removable cover 32 of film magazine 33, the outer end of the spindle being spaced a short distance from the inner face of cover 32. The outer end of spindle 30 has a transverse groove or notch 30' adapted to take a transverse key or web 34 which extends across the outer end of the bore of the smaller hub part 18a. This web 34 is preferably molded integrally with the hub. The axial length of hub 18, with relation to the axial length of barrel halves 10 and 11, is shown in Figs. 3, 4 and 6. When the hub is mounted on spindle 30 in the position of Fig. 6, one end of the barrel assembly 10, 11 is spaced close to the inner face of magazine cover 32, but the corresponding end of hub 18 is spaced a somewhat larger distance from the inner face of the cover, allowing space for the longitudinally movable cap 35 which fits slidingly over the smaller hub part 18a. With cap 35 in its innermost position (Figs. 4 and 6) and with its inner end against the hub shoulder 18c as illustrated, the outer face of cap 35, or a central protuberance 35a on its outer face, either lightly contacts the inner face of magazine cover 32, or nearly contacts that cover face. Hub 18 is limited against further movement on spindle 30 toward the left in Fig. 6 by web 34 contacting the bottom of notch 30'. Thus, when the parts are in the position shown in Fig. 6, cap 35 is held in its innermost position by magazine cover 32.

Movement of cap 35 from its outer position shown in Fig. 3 to its inner position shown in Figs. 4 and 6 expands the drum members 10 and 11 from their contracted to their expanded positions. The means through which that is done preferably comprises a set of two toggles 40, each of which is pivoted at its inner end at 41 to a pivot lug 42 extending laterally and longitudinally from the inner end of cap 35. The outer ends of the links 40 are pivoted at 43 to the drum members 10 and 11. Pivot pins 43 are set in two flange lugs 44 which are formed in the barrel members at the ends of external recesses 45. Pivots 43 are located centrally of the axial lengths of members 10 and 11. Pivots 41 are so located with reference to cap 35 that, in the position of Fig. 4, pivots 41 lie just to the left of a straight line between pivots 43; while in the position of Fig. 3, pivots 41 lie in such a position that the inner ends of the links have passed outwardly through that straight line and beyond it. Thus, in the position of Fig. 3, the two barrel halves 10 and 11 are contracted by the angular positions of the links, the limit of contraction and the limit to outward movement of cap 35 being caused by the two edges 22 abutting each other. From the contracted position of Fig. 3, the spool is expanded to the expanded positions of Figs. 1, 2 and 4 simply by pushing cap 35 inwardly to the limit of its motion against the shoulder 18c. In that position links 40 have passed over center so that the compressing pressure of the coil of film wound on the spool cannot contract the spool.

In using the improved spool it may be placed upon spindle 30 in its contracted position, with the film gripping edges 20 open. The end of the film may then be inserted between gripping edges 20 and inward movement of cap 35 will then expand the spool and grip the film. Or, the end of the film may be inserted between gripping edges 20, with the spool in contracted condition, before the spool is placed upon the spindle. Then if the spool is placed upon the spindle by holding cap 35 in the fingers and pushing inwardly on the cap to move the spool onto the spindle, the same movement will move the cap inwardly, expand the spool and grip the film end. With the spool in place on the spindle, magazine cover 32 is then put in place or closed, and its placement will move cap 35 inwardly and expand the spool and grip the film end, if that operation has not been previously performed. And, in any event, cover 32 positively prevents cap 35 from moving outwardly and thus prevents the spool from collapsing.

After the film has been wound on the spool, the spool and the coil of film may be removed from the spindle, after cover 32 has been removed, by handling the whole organization through cap 35. The contracting pressure of the coil of film will usually be sufficient to hold cap 35 in its inner position unless a substantial force is applied to pull the cap outwardly. At any time, either before the spool is removed from the spindle or after that removal, the spool may be contracted by pulling outwardly on the cap and pulling it to its outer position of Fig. 3. By so doing the gripped end of the film is released to slide out of the spool in a longitudinal direction, and the spool is contracted sufficiently to be easily withdrawn from the center of the film coil.

The materials of the spool parts may be anything suitable or desired. The particular design here shown is intended for molding the major parts (the barrel halves 10 and 11, hub 18 with its bracket 17, and cap 35) of some suitable plastic. The other smaller parts, such as the pivot pins and links 40 are intended to be of metal.

I claim:

1. In a collapsible and expansible winding spool, the combination of a mounting hub adapted for removable placement on a spindle, a pivot carrying bracket on the hub and extending radially from it, a hinge pivot carried by the bracket on an axis parallel to and radially spaced from the hub axis, a pair of semi-cylindric winding drum members arranged in cylindric formation with their diametral faces spaced apart and each pivoted on the hinge pivot so that the hinge pivot lies between the two spaced diametral faces and lies relatively close to one of the opposed pair of diametral face edges of the members, and means, including an actuating member movable axially of the hub, for moving the two winding drum members relatively about the hinge pivot.

2. Collapsible and expansible winding spool as defined in claim 1, and in which the last mentioned means comprises a cap slidable axially on one end of the mounting hub, and a pair of links each pivoted at one end to the cap and at the other end to one of the winding drum members.

3. Collapsible and expansible winding spool as defined in claim 1, and in which the last mentioned means comprises a cap slidable axially on one end of the mounting hub, and a pair of links each pivoted at one end to the cap and at the other end to one of the winding drum members, the arrangement of the cap and links being such that axial movement of the cap moves the links through positions in which they stand at right angles to the hub axis.

4. The combination comprising, a film magazine having a removable cover, a winding drum spindle journaled in the magazine and having a free end projecting toward the inner face of the magazine cover, a collapsible and expansible winding spool having a central hub adapted to be placed upon the spindle, two-part-cylindric winding drum members pivotally carried by the hub and adapted to expand and contract by relative pivotal movement, an actuating member movable axially of the hub and adapted to be confined to the magazine cover to an inward position on the hub, and means connecting said member and the winding drum members in such manner that the winding drum members are expanded when the actuating member lies in said inward position.

5. In a collapsible and expansible winding spool, the combination of a mounting hub adapted for removable placement on a spindle, a pivot carrying bracket on the hub and extending radially from it, a pair of part-cylindric winding drum members arranged in cylindric formation about the axis of the hub, means pivoting each of the two members to the hub bracket on an axis parallel to and radially spaced from hub axis, and means for moving the two members pivotally to and from each other comprising a cap slidable axially on one end of the mounting hub, and a pair of links each pivoted at one end to the cap and at the other end to one of the winding drum members.

6. Collapsible and expansible winding spool as defined in claim 5, and in which the arrangement of the cap and links is such that axial movement of the cap moves the links through positions in which they stand at right angles to the hub axis.

EDWARD G. BADER.

REFERENCES CITED

The following references are of record in the file of this patent:

FOREIGN PATENTS

| Number | Country | Date |
| --- | --- | --- |
| 1,003,255 | Hansen | Sept. 12, 1911 |
| 1,337,017 | Kenworthy | Apr. 13, 1920 |
| 1,780,510 | Wise | Nov. 4, 1930 |
| 1,838,432 | Mitchell | Dec. 29, 1931 |
| 1,845,526 | Spence | Feb. 16, 1932 |
| 1,954,255 | Moreno | Apr. 10, 1934 |
| 1,986,090 | Winters | Jan. 1, 1935 |

FOREIGN PATENTS

| Number | Country | Date |
| --- | --- | --- |
| 636,742 | Germany | Oct. 14, 1936 |